US012315382B2

(12) United States Patent
Hosamani et al.

(10) Patent No.: US 12,315,382 B2
(45) Date of Patent: May 27, 2025

(54) SYSTEMS AND METHODS FOR COLLECTING AND DISSEMINATING STRUCTURE INFORMATION FROM MOUNTED SMART LIGHTS

(71) Applicant: The Boeing Company, Chicago, IL (US)

(72) Inventors: Umesh Hosamani, Bangalore (IN); Nisha Jalaja, Bangalore (IN)

(73) Assignee: The Boeing Company, Arlington, VA (US)

( * ) Notice: Subject to any disclaimer, the term of this patent is extended or adjusted under 35 U.S.C. 154(b) by 219 days.

(21) Appl. No.: 17/989,612

(22) Filed: Nov. 17, 2022

(65) Prior Publication Data

US 2024/0168492 A1 May 23, 2024

(51) Int. Cl.

*G08G 5/76* (2025.01)
*G08G 5/21* (2025.01)
*G08G 5/34* (2025.01)

(52) U.S. Cl.

CPC ................. *G08G 5/76* (2025.01); *G08G 5/21* (2025.01); *G08G 5/34* (2025.01)

(58) Field of Classification Search

CPC ... G08G 5/0091; G08G 5/0021; G08G 5/0039
USPC .......................................................... 701/120
See application file for complete search history.

(56) References Cited

U.S. PATENT DOCUMENTS 9,162,753 B1 10/2015 Panto et al.
10,007,265 B1 * 6/2018 Larsen ............... B64D 45/0034
10,281,916 B1 * 5/2019 Cui ........................ G05D 1/101
10,721,375 B1 * 7/2020 Boyd ..................... H04N 7/183
11,257,388 B2 2/2022 Shamasundar et al.
2016/0328983 A1 11/2016 Hutchinson et al.
2017/0206414 A1 7/2017 Schultz et al.
2017/0257547 A1 * 9/2017 Safarik .................. H04N 23/71
2021/0134166 A1 * 5/2021 Shamasundar ...... G08G 5/0086
2022/0385363 A1 * 12/2022 Gette ................. H04B 10/1125
2023/0058536 A1 * 2/2023 Moeykens ........... G08G 5/0069

(Continued)

FOREIGN PATENT DOCUMENTS

CN 105791687 A * 7/2016
CN 106872194 A * 6/2017 ............. G01D 21/02
CN 109564418 A * 4/2019 ........... B64C 39/024

(Continued)

OTHER PUBLICATIONS

Yoo Su Yeop (WO2021182728A1); Lidar System Corresponding To Artificial Intelligence; XAOS Motors Co Ltd. (Year: 2021).*

*Primary Examiner* — B M M Hannan
(74) *Attorney, Agent, or Firm* — Kunzler Bean & Adamson

(57) ABSTRACT

Disclosed herein is a collection and dissemination system and method for attain structure characteristics information directly from encoded light signals produced by lights mounted to structures. An exemplary aircraft includes a light receiver, a data communication device, a processor, and a memory device. The light receiver receives light from a light-emitting device mounted to a structure. The memory device stores computer-executable code configured to cause the processor to perform steps of converting the light received by the light receiver into a data signal and transmitting the data signal to a navigation server via the data communication device, a network node, and a network.

20 Claims, 6 Drawing Sheets

(56) References Cited

U.S. PATENT DOCUMENTS

| | | | | |
|---|---|---|---|---|
| 2023/0078803 | A1* | 3/2023 | Wiegman | G08G 5/0013 701/3 |
| 2023/0109847 | A1* | 4/2023 | Gurusamy | G06F 16/29 701/9 |

FOREIGN PATENT DOCUMENTS

| | | | | | |
|---|---|---|---|---|---|
| CN | 110641715 | A | * | 1/2020 | B64D 45/08 |
| CN | 115753661 | A | * | 3/2023 | |
| CN | 116069219 | A | * | 5/2023 | G06F 3/04842 |
| DE | 4215348 | A1 | * | 11/1993 | H04L 25/4923 |
| EP | 4266143 | A1 | * | 10/2023 | B64C 39/02 |
| EP | 4336750 | A1 | * | 3/2024 | B63G 8/001 |
| JP | 2022144241 | A | * | 10/2022 | H01L 27/14609 |
| KR | 102186830 | B1 | * | 12/2020 | |
| KR | 20220067656 | A | * | 5/2022 | |
| WO | WO-2020113475 | A1 | * | 6/2020 | G01S 17/10 |

* cited by examiner

SYSTEMS AND METHODS FOR COLLECTING AND DISSEMINATING STRUCTURE INFORMATION FROM MOUNTED SMART LIGHTS

FIELD

This disclosure relates generally to obstruction detection and warning, and more particularly relates to detecting and warning of obstructions using light emitted from obstructions.

BACKGROUND

Traffic congestion in densely populated areas has prodded research into alternate transportation platforms. One such alternative transportation platform is referred to as urban air mobility. Urban air mobility (UAM) refers to the use of relatively small and lightweight aircraft (either manned or unmanned) to transport passengers between destinations in the same urban area. It is envisioned that such aircraft, which are sometimes referred to as "air taxis," may use high rise rooftops or other relatively tall structures (e.g., parking garages) as landing/takeoff locations and where passengers would embark to and disembark from the aircraft.

It is further envisioned that UAM aircraft will be operated at relatively low altitudes that are not within the jurisdiction of governmental regulatory authorities, such as the Federal Aviation Administration (FAA). In many instances, the operational altitudes may be below the maximum height of buildings or other structures in the urban area being served. Thus, the ability to detect and avoid potential obstructions, such as buildings and other structures, in real-time will be of utmost importance.

One proposed solution to obstruction detection is the use of on-board terrain and obstacle databases. Unfortunately, this solution has some associated drawbacks. For example, the databases would need to be maintained and updated at set periodicities. Moreover, there would not be a redundant method to validate the database information during a flight.

SUMMARY

The subject matter of the present application has been developed in response to the present state of the art, and in particular, in response to the shortcomings of conventional obstruction detection systems and techniques, that have not yet been fully solved by currently available techniques. Accordingly, the subject matter of the present application has been developed to provide near real-time updating of characteristics of structures in an airspace.

An exemplary aircraft includes a light receiver, a data communication device, a processor, and a memory device. The light receiver is configured to receive light from a light-emitting device mounted to a structure. The data communication device is configured to communicate with a network via a network node. The processor is coupled to the light receiver and the data communication device so that data signals are transmittable between the processor and the light receiver and between the processor and the data communication device. The memory device is configured to store computer-executable code configured to cause the processor to perform steps of converting the light received by the light receiver into a data signal and transmitting the data signal to a navigation server via the data communication device, the network node, and the network.

An exemplary method includes receiving light from a light-emitting device mounted to a structure, converting the light, received by the light receiver, into a data signal, and transmitting the data signal to a navigation server via a data communication device disposed on the aircraft, a network node, and a network.

An exemplary navigation server includes a data communication device, a processor, and a memory device. The data communication device is configured to communicate with a network via a network node. The memory device is configured to store computer-executable code configured to cause the processor to perform steps of receiving a data signal from an aircraft or a light-emitting device associated with a structure. The data signal includes information regarding characteristics of the structure or weather information proximate the structure. The method also includes storing the characteristics of the structure and the information regarding the weather information proximate the structure and making the characteristics of the structure or the information regarding the weather proximate the structure available for aircraft control devices via a network.

An exemplary method performed at a navigation server includes receiving a data signal from an aircraft or a light-emitting device associated with a structure, the data signal comprises information regarding characteristics of the structure or weather proximate the structure, storing the information, and making the stored information available for aircraft control devices via a network The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Figure 1:
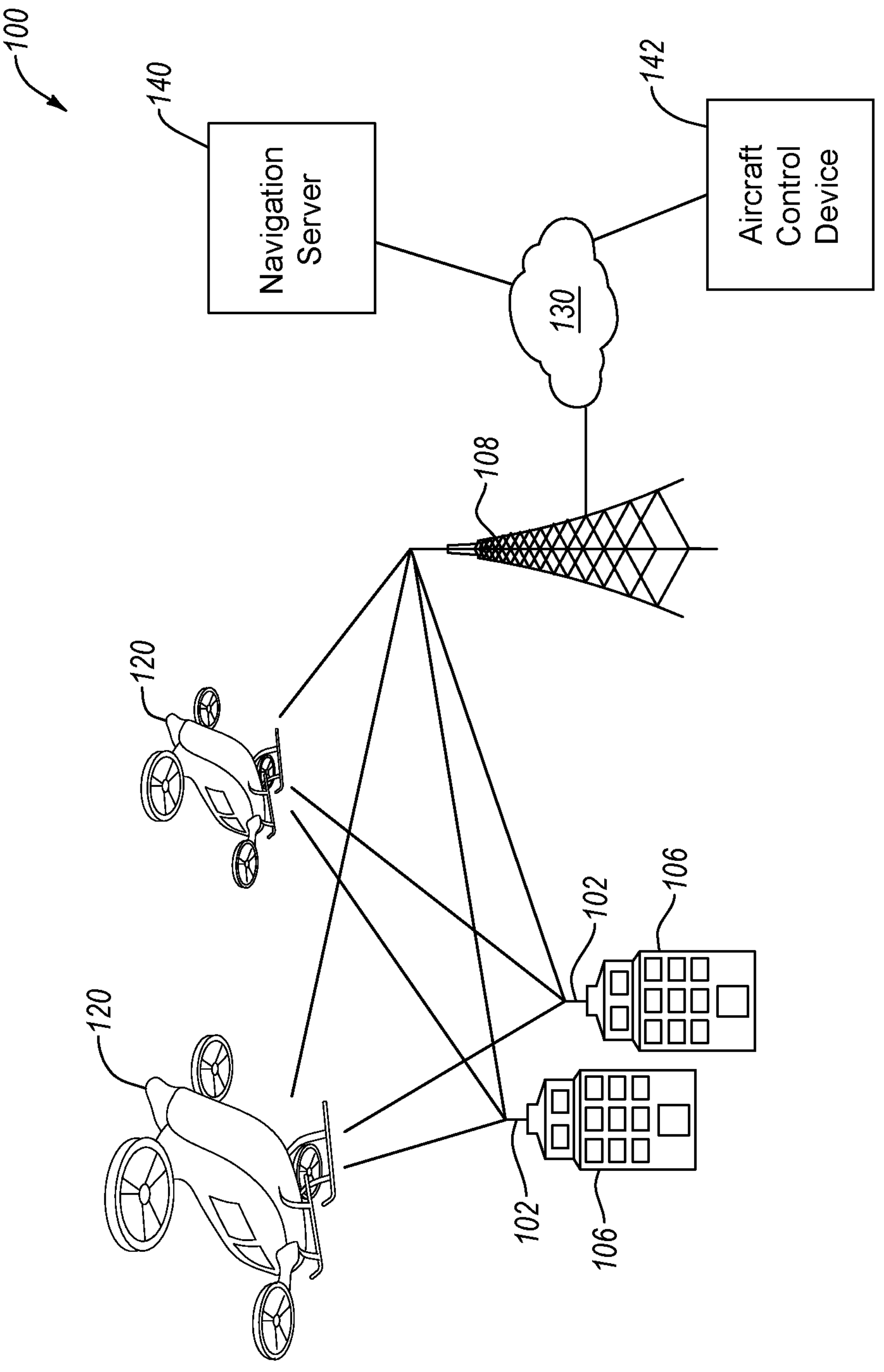
FIG. 1 is a schematic block diagram of a structure detection and dissemination system, according to one or more examples of the present disclosure.

Referring to FIG. 1, a functional block diagram of one embodiment of a structure detection and dissemination system 100 is depicted. The system 100 includes a plurality of light-emitting devices 102. Each of the light-emitting devices 102 is mounted on a structure 106. Although FIG. 1 depicts two structures 106 having light-emitting devices 102 disposed thereon, it will be appreciated that this is done for clarity and ease of depiction and illustration. It will be appreciated that a plurality of structures 106 may have one or more of the light-emitting devices 102 disposed thereon. Indeed, before proceeding further, it is noted that governmental regulatory bodies, such as the Federal Aviation Administration (FAA) and the International Civil Aviation Organization (ICAO), promulgate regulations that require all structures having a height that exceeds 200 feet (61 meters) above ground level to be marked with lighting. The light-emitting devices 102 disclosed herein may be used to meet this marking requirement.

As FIG. 1 further depicts, each light-emitting device 102 is also operable to emit a light beam at an angular rate around an axis of rotation. To implement this functionality, each light-emitting device 102 may include a non-illustrated motor that causes physical rotation around the axis of rotation, or each light-emitting device 102 may be controlled in a manner that causes the light beam it emits to rotate around the axis of rotation. For example, each light-emitting device 102 may include a plurality of lights (e.g., light-emitting diodes (LEDs) 114) that are selectively energized in a manner that causes the emitted light beam to appear to rotate.

Figure 2:
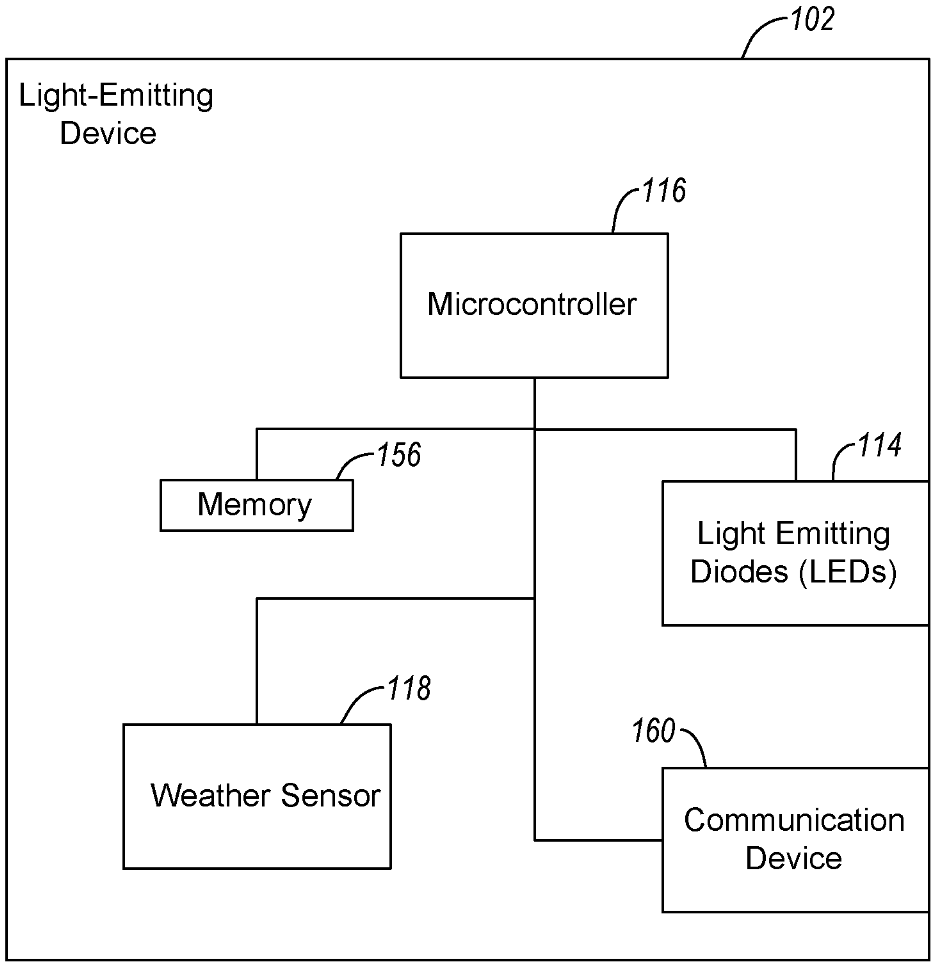
FIG. 2 is a schematic block diagram of structure-mounted light-emitting device, according to one or more examples of the present disclosure.

Regardless of the technique that is used to rotate the emitted light beam around the axis of rotation, it is noted that the term "light emitter" refers to an intelligent light-emitting device that is not just operable to emit a light beam, but is also capable of receiving, processing, and broadcasting information. Indeed, in the depicted embodiment, each light-emitting device 102 is operable to emit a light beam that is encoded with data that indicates information (e.g., position and height) of the structure 106, to which the light-emitting device 102 is attached, or other information, such as, without limitation, weather information (e.g., wind, precipitation, visibility, atmospheric pressure, and/or icing) in an area proximate the structure 106. Referring additionally to FIG. 2, each light-emitting device 102 includes the plurality of LEDs 114 (or other light-generating devices), a microcontroller 116, and/or a weather sensor 118. The microcontroller 116 is coupled to the LEDs 114 and is configured to drive the LEDs 114 in a manner that causes the light-emitting device 102 to emit the light beam with the encoded data. The light-emitting device 102 may include a memory 156 and a communication device 160 that are in data communication with the microcontroller 116. The microcontroller 116 may implement its functionality by, for example, executing instructions stored in the memory 156. The communication device 160 may communicate wirelessly with the network node 108 or other wireless devices that are connected to the network 130 or may communicate with the network 130 via a device that has a wired connection with the communication device 160.

Light fidelity (Li-Fi) technology includes wireless communication devices that are focused mainly on the use of visible light between violet (800 THz) and red (400 THz). Li-Fi is based on propagation of information in a defined and uniform fashion via amplitude modulation of a light supply or light wave. An LED transmitter on one end and a photo detector (light sensor) on the other end provides the operable components of a Li-Fi system. Li-Fi operates very simple and fast. The data inputted to the LED transmitter is encoded into light by varying the flickering rate at which binary code (1s and 0s) is generated by LEDs flicker 'ON' and 'OFF'. LED transmitter's on/off operation is invisible to the human eye having cycling speeds of less than a microsecond. Li-Fi is well known in the art and no further explanation is necessary for a person of skill in the art to understand disclosed subject matter.

In various embodiments, the weather sensor 118 may include a variety of weather sensing devices for sensing a variety of weather information, such as, without limitation, air pressure, temperature, humidity, wind velocity, wind direction, etc. The sensed weather information is sent to the microcontroller 116 for transmission to the devices/systems external to the light-emitting device 102 via the communication device 160. The microcontroller 116 may determine that the sensed weather information identifies a weather event or weather obstruction. Alternatively and additionally, the identified weather event or weather obstruction is transmitted to the devices/systems external to the light-emitting device 102 via the communication device 160.

Figure 3:
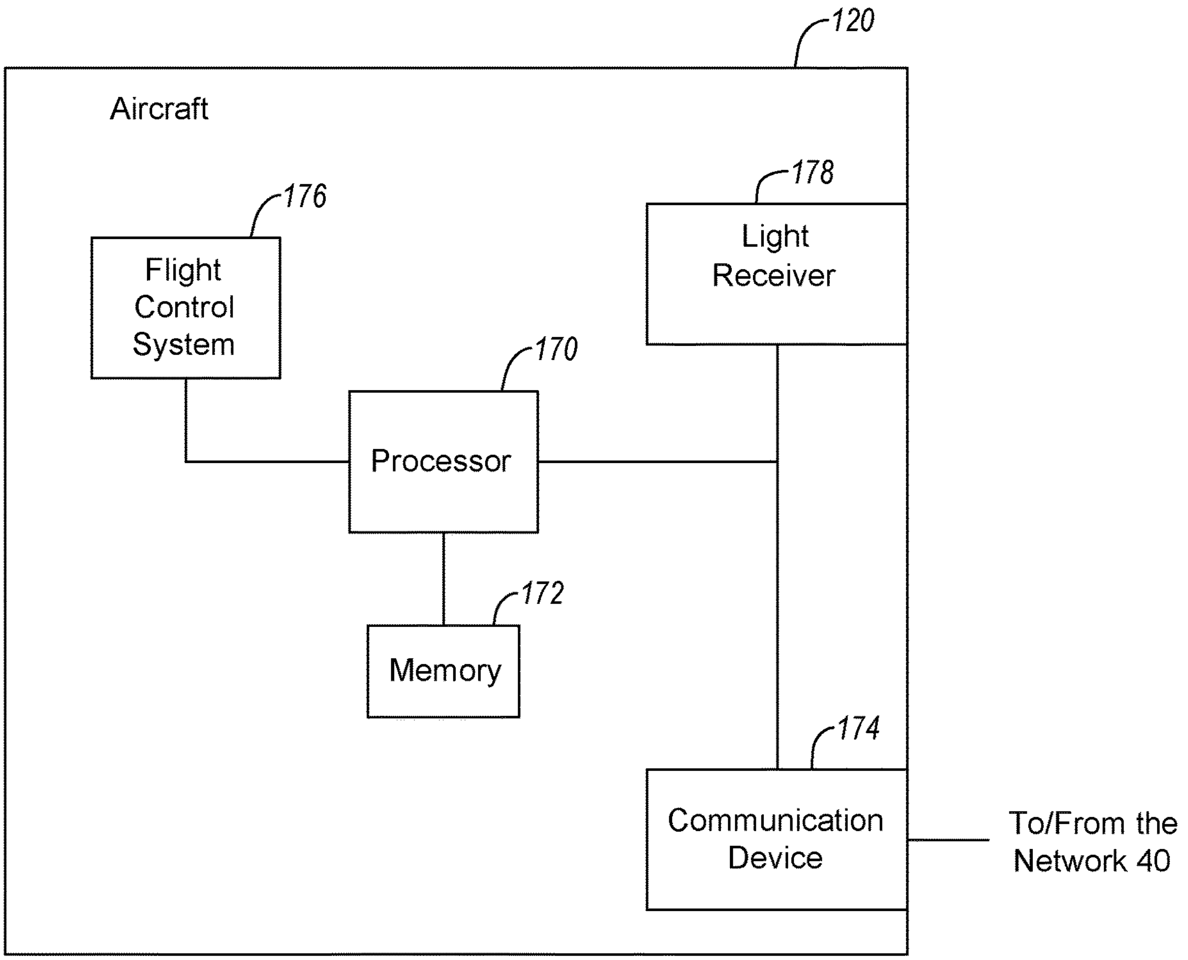
FIG. 3 is a schematic block diagram of an aircraft, according to one or more examples of the present disclosure.

Referring additionally to FIG. 3, in various embodiments, the system 100 also includes one or more aircraft 120. The aircraft 120 may be implemented using any one of numerous types of jet aircraft, non-jet aircraft, rotorcraft, or lighter-than-air (LTA) craft and may be either a manned aircraft or an unmanned aircraft. The aircraft 120, whether manned or unmanned, may also be configured to carry payload, such as various types and sizes of cargo, passengers (e.g., air taxis), or both. The aircraft 120 includes a processor 170 and a light receiver 178 that receives the light beam emitted from the light-emitting device 102. Also, the aircraft 120 includes a memory device 172 and a communication device 174 that are both in data communication with the processor 170. The communication device 174 provides signal communication with other aircraft 120, the light-emitting device 102, and/or the network node 108. The light receiver 178 sends the received light beam to the processor 170 for decoding and/or forwarding to a navigation server 140 or an aircraft control device 142 via the network 130 and the network node 108. The processor 170 may implement its functionality by, for example, executing instructions stored in a memory device 172.

It should be noted that although decoding is implemented in the processor 170, its functionality may, at least in some embodiments, be implemented in the light receiver 178. The processor 170 is operable to decode the encoded data from the received light beam and to supply the decoded data to the navigation server 140, the aircraft control device 142, or some other processing device connected to the network node 108 and/or the network 130.

The processor 170 is configured to determine information, such as, without limitation, width and height, of the structure 106 or weather information from the decoded data. The processor 170 is also configured to determine the distance from the aircraft 120 to the structure 106, or to a weather event associated with the weather information, using aircraft location information from a global positioning system or other location sensing device.

As was noted above, the aircraft 120 also includes a flight control system 176 that is configured to communicate with the processor 170 to receive the position and height of the structure 106 and/or the weather information of weather proximate to the structure 106. The flight control system 176 is also configured to control operation of the aircraft 120 and/or generate and supply situational cues to an operator of the aircraft 120.

The situational cues supplied to the operator may be visual, aural, and/or tactile. Thus, the aircraft 120 may additionally include a display device (not shown), a sound emitter (not shown), and/or a haptic device (not shown). The display device, when included, is in operable communication with the processor 170 and is configured, in response to commands received from the processor 170, to render one or more images based on the situational cues. The sound emitter, when included, is in operable communication with the processor 170 and is configured, in response to commands received from the processor 170, to aurally emit based on the situational cues. The haptic device, when included, is in operable communication with the processor 170 and is configured, in response to commands received from the processor 170, to emit vibrations based on the situational cues.

It should be noted that the operator may be located within the aircraft 120, if it is a manned aircraft, or located remote at the aircraft control device 142 remote from the aircraft 120, if it is an unmanned aircraft.

Referring back to FIG. 3, the situational cues supplied by the processor 170 may vary and may depend, for example, on aircraft speed, altitude, trajectory, and proximity to the structure 106 or the weather event. For example, if the aircraft 120 is above the height of the structure 106, but its active trajectory, based on the flight plan, would result in a collision with the structure 106 or contact with the weather event, the processor 170 or the flight control system 176 may generate and supply either an obstruction caution or an obstruction warning, depending upon a predicted time to impact/contact. The obstruction caution may be displayed in a first color (such as yellow) whereas the obstruction warning may be displayed in a different, distinguishable color (such as red). The caution or warning may also include a distance and/or time to impact, or various other information useful to the operator. The situational cues may also include a preferred maneuver to avoid the collision. For example, the situational cues may cue the operator to increase aircraft altitude (either immediately or within a prescribed time period), to turn the aircraft 120 in a port or starboard direction (either immediately or within a prescribed time period), or both. As may be appreciated, the specific situational cues and the manner in which each is provided to the operator are numerous and varied.

In various embodiments, the flight control system 176 provides autopilot functionality. The flight control system 176 receives any situational cues and automatically controls travel (e.g., speed, pitch, roll, and/or yaw) of the aircraft 120 to avoid the structures 106 or the weather event.

Figure 4:
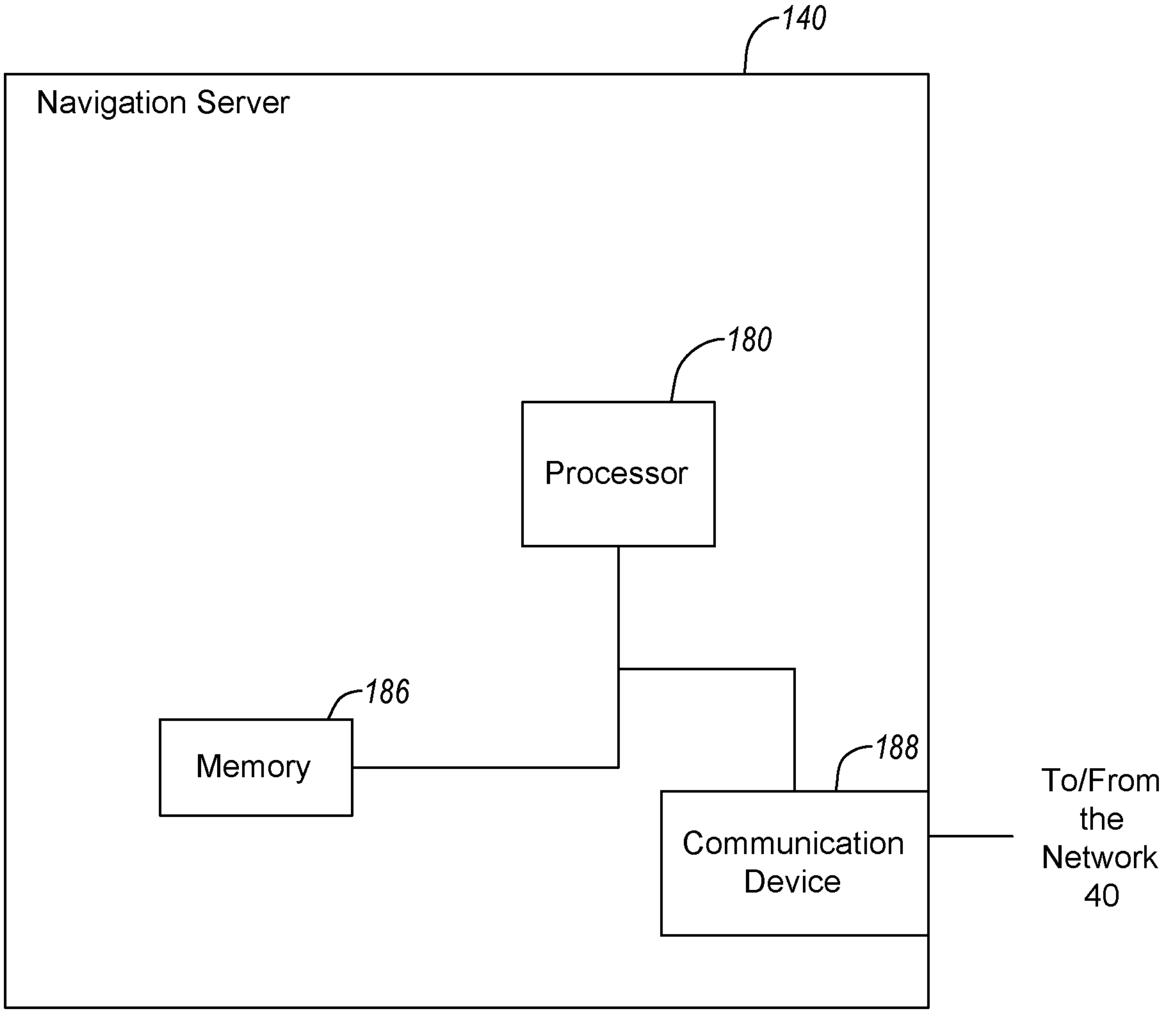
FIG. 4 is a schematic block diagram of a navigation server, according to one or more examples of the present disclosure.

Referring to FIG. 4, the navigation server 140 includes a processor 180 in data communication with a memory 186 and a communication device 188. The communication device 188 receives the information about the structure(s) 106 via the network 130 as described above. The processor 180, based on execution of instructions stored in the memory 186, stores the received information about the structure(s) 106 in the memory 186. The processor 180 compares the received information about the structure(s) 106 to previously stored information about the structure(s) 106. If the processor 180 determines that information has already been stored for one of the structures 106, the processor 180 determines if the information is identical. If the information is identical, the processor 180 will either not store the newly received information or will remove stored duplicates of the information. It can be appreciated that there may be situations where the information for one of the structures 106 has already been stored, but newly received information for the one of the structures 106 may be different. This may occur during building construction or addition of antennas or other features to an existing structure 106. In this case the newly received information will overwrite the previously stored information in the memory 186.

Figure 5:
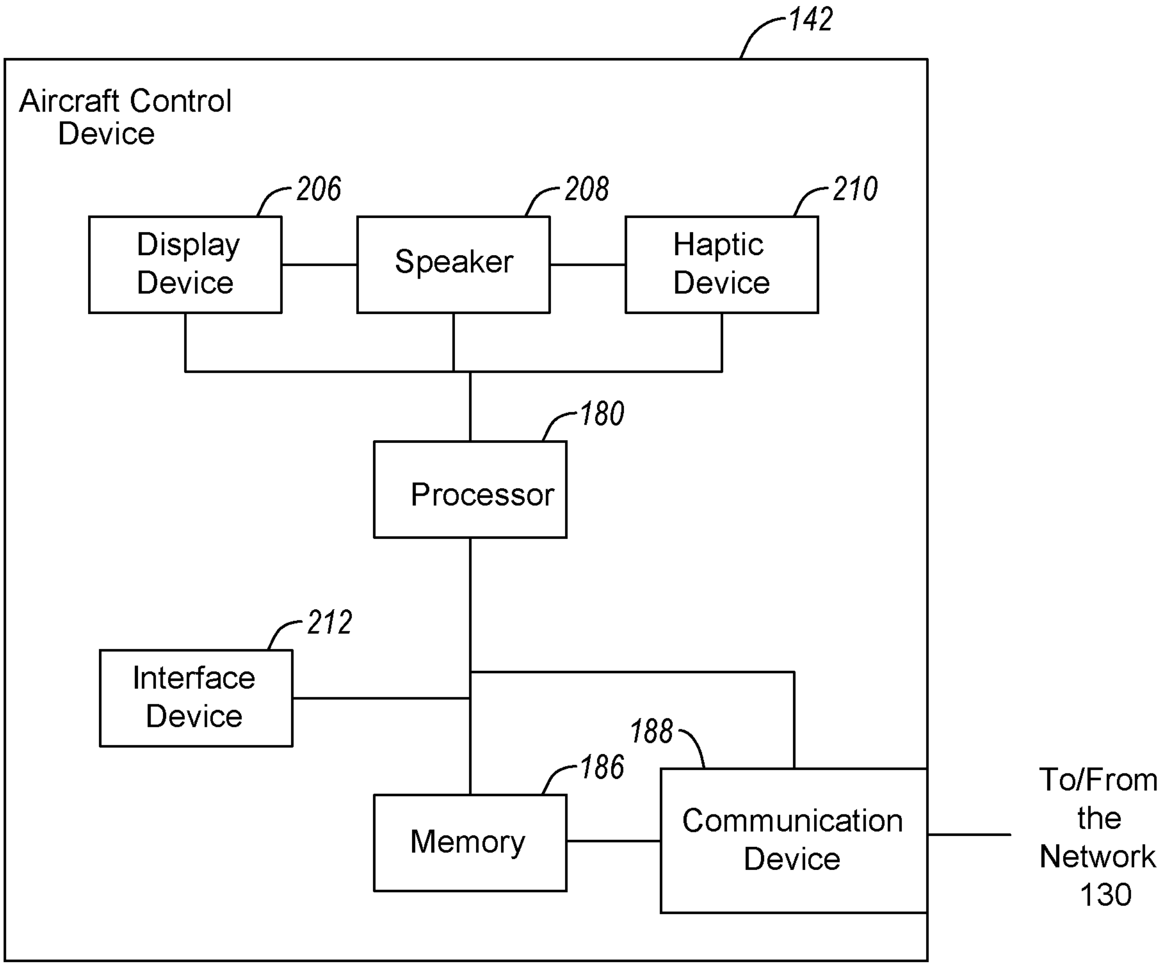
FIG. 5 is a schematic block diagram of an aircraft control device, according to one or more examples of the present disclosure.

Referring to FIG. 5, the aircraft control device 142 may include a processor 200, memory 202, a communication device 204, a display device 206, a sound emitter (speaker 208), a haptic device 210, and an interface device 212. The components of the aircraft control device 142 are configured to allow an operator to receive situational cues and control operation of the aircraft 120 in response to the situational cues, the obstruction information, and/or the weather obstruction information.

Figure 6:
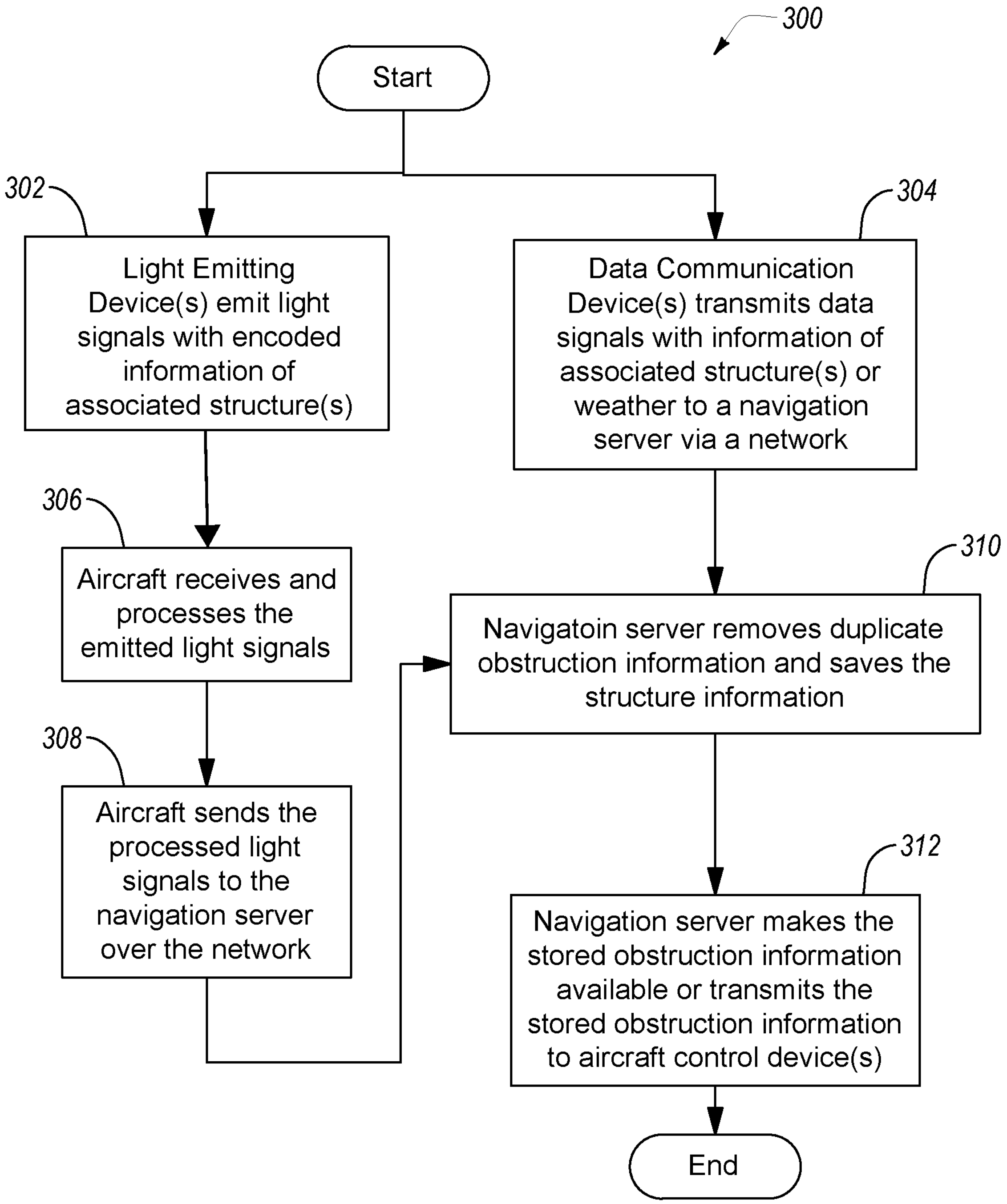
FIG. 6 is a schematic flow chart of a method of receiving, saving, and making available flight obstruction information, according to one or more examples of the present disclosure.

Referring to FIG. 6, according to one example, a method 300 of providing structure information to a navigation server for dissemination is shown. The method 300 includes (block 302) LED(s) emitting light signals with encoded information of an associated structure(s). Additionally, the method 300 includes (block 304) a data communication device(s) at the structure(s) or LED(s) transmitting data signals with information of associated structure(s) to a navigation server via a network. Additionally, the method 300 includes (block 306) an aircraft receiving and processing the emitted light signals. Additionally, the method 300 includes (block 308) the aircraft sending the processed light signals to the navigation server over the network. Additionally, the method 300 includes (block 310) the navigation server removing duplicate obstruction information and saves the structure information. Additionally, the method 300 includes (block 312) the navigation server making the stored obstruction information available as a database to the flight operators or transmits the stored obstruction information to aircraft control devices.

The following is a non-exhaustive list of examples, which may or may not be claimed, of the subject matter, disclosed herein.

The following portion of this paragraph delineates example 1 of the subject matter, disclosed herein. According to example 1, an aircraft comprises a light receiver, a data communication device, a processor, and a memory device. The light receiver is configured to receive light from a light-emitting device mounted to a structure. The data communication device is configured to communicate with a network via a network node. The processor is coupled to the light receiver and the data communication device so that data signals are transmittable between the processor and the light receiver and between the processor and the data communication device. The memory device is configured to store computer-executable code configured to cause the processor to perform the steps of converting the light received by the light receiver into a data signal and transmitting the data signal to a navigation server via the data communication device, the network node, and the network.

The following portion of this paragraph delineates example 2 of the subject matter, disclosed herein. According to example 2, which encompasses example 1, above, the received light includes information regarding characteristics of the structure or weather proximate the structure.

The following portion of this paragraph delineates example 3 of the subject matter, disclosed herein. According to example 3, which encompasses example 2, above, the characteristics of the structure comprise position or dimensional characteristics of the structure.

The following portion of this paragraph delineates example 4 of the subject matter, disclosed herein. According to example 4, which encompasses any one of examples 1-3, above, the step of converting the light received by the light receiver into the data signal comprises decoding the light received by the light receiver.

The following portion of this paragraph delineates example 5 of the subject matter, disclosed herein. According to example 5, which encompasses any one of examples 1-4, above, the data signal includes position and dimensional characteristics of the structure and the computer-executable code is further configured to cause the processor to perform a step of determining the structure is an obstruction based on the position and dimensional characteristics of the structure and a desired flight path of the aircraft or determining the weather is a weather obstruction based on the information regarding the weather proximate the structure and the desired flight path of the aircraft.

The following portion of this paragraph delineates example 6 of the subject matter, disclosed herein. According to example 6, which encompasses example 5, above, the data signal includes position and dimensional characteristics of the structure and the code is further configured to cause the processor to perform the step of generating navigation signals responsive to the obstruction or the weather obstruction.

The following portion of this paragraph delineates example 7 of the subject matter, disclosed herein. According to example 7, which encompasses example 6, above, the navigation signals include a safe route to navigate or a closest safe landing place.

The following portion of this paragraph delineates example 8 of the subject matter, disclosed herein. According to example 8, a method comprises receiving light from a light-emitting device mounted to a structure, converting the light received by the light receiver into a data signal, and transmitting the data signal to a navigation server via a data communication device disposed on the aircraft, a network node, and a network.

The following portion of this paragraph delineates example 9 of the subject matter, disclosed herein. According to example 9, which encompasses example 8, above, the received light includes information regarding characteristics of the structure or weather proximate the structure.

The following portion of this paragraph delineates example 10 of the subject matter, disclosed herein. According to example 10, which encompasses example 9, above, information of the structure includes position and dimensional characteristics of the structure.

The following portion of this paragraph delineates example 11 of the subject matter, disclosed herein. According to example 11, which encompasses any one of examples 7-9, above, converting the light received by the light receiver into the data signal comprises decoding the light received by the light receiver.

The following portion of this paragraph delineates example 12 of the subject matter, disclosed herein. According to example 12, which encompasses any one of examples 8-11, above, the data signal includes position and dimensional characteristics of the structure and the method further comprises determining flight path of the aircraft and determining the structure is an obstruction based on the position and dimensional characteristics of the structure and the flight path of the aircraft or determining the weather is a weather obstruction based on the information regarding the weather proximate the structure and the flight path of the aircraft.

The following portion of this paragraph delineates example 13 of the subject matter, disclosed herein. According to example 13, which encompasses example 12, above, the method further comprises generating navigation signals responsive to the obstruction or the weather obstruction.

The following portion of this paragraph delineates example 14 of the subject matter, disclosed herein. According to example 14, a server device comprises a data communication device configured to communicate with a network via a network node, a processor in data communication with the data communication device, and a memory device. The memory device is configured to store computer-executable code configured to cause the processor to perform the steps of receiving a data signal from an aircraft or a light-emitting device associated with a structure, storing the data signal, and making the stored information available as a database for the flight operators or for aircraft control servers via a network. The data signal comprises information regarding characteristics of the structure.

The following portion of this paragraph delineates example 15 of the subject matter, disclosed herein. According to example 15, which encompasses example 14, above, receiving the data signal includes decoding the data signal to generate the information regarding the characteristics of the structure or weather information proximate the structure.

The following portion of this paragraph delineates example 16 of the subject matter, disclosed herein. According to example 16, which encompasses any one of examples 14 and 15, above, the code is further configured to cause the processor to perform the steps of receiving a request for information of the characteristics of the structure or the weather information proximate the structure from one of the aircraft control devices; and delivering the information of the characteristics of the structure or the weather information proximate the structure to the one of the aircraft control devices responsive to the request.

The following portion of this paragraph delineates example 17 of the subject matter, disclosed herein. According to example 17, which encompasses example 16, above, the code is further configured to cause the processor to perform the step of removing duplicate information of the characteristics of the structure or the weather from the memory device.

The following portion of this paragraph delineates example 18 of the subject matter, disclosed herein. According to example 18, which encompasses any one of examples 14-17, above, storing includes determining if previously stored information regarding the characteristics or the weather of the structure is identical to currently received information regarding the characteristics or the weather proximate of the structure, and storing the currently received information regarding the characteristics or the weather responsive to the currently received information regarding the characteristics or the weather not being identical to the previously stored information regarding the characteristics or the weather proximate of the structure.

The following portion of this paragraph delineates example 19 of the subject matter, disclosed herein. According to example 19, a method comprising receiving a data signal from an aircraft or a light-emitting device associated with a structure, the data signal comprises information regarding characteristics of the structure or weather proximate the structure, storing the information, and making the stored information available for aircraft control servers via a network. The data signal comprises information regarding the characteristics of a structure associated with the light emitting device.

The following portion of this paragraph delineates example 20 of the subject matter, disclosed herein. According to example 20, which encompasses example 19, above, the method further comprises decoding the data signal to generate the information regarding the characteristics of the structure, storing the obstruction information responsive to the information regarding the characteristics of the structure not matching previously stored information regarding the characteristics of the structure, and delivering the obstruction information to the aircraft control devices.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms “a,” “an,” and “the” also refer to “one or more” unless expressly specified otherwise. Further, the term “plurality” can be defined as “at least two.”

Additionally, instances in this specification where one element is “coupled” to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, “adjacent” does not necessarily denote contact. For example, one element can be adjacent another element without being in contact with that element.

As used herein, the phrase “at least one of”, when used with a list of items, means different combinations of one or more of the listed items may be used and only one of the items in the list may be needed. The item may be a particular object, thing, or category. In other words, “at least one of” means any combination of items or number of items may be used from the list, but not all of the items in the list may be required. For example, “at least one of item A, item B, and item C” may mean item A; item A and item B; item B; item A, item B, and item C; or item B and item C. In some cases, “at least one of item A, item B, and item C” may mean, for example, without limitation, two of item A, one of item B, and ten of item C; four of item B and seven of item C; or some other suitable combination.

Unless otherwise indicated, the terms “first,” “second,” etc. are used herein merely as labels, and are not intended to impose ordinal, positional, or hierarchical requirements on the items to which these terms refer. Moreover, reference to, e.g., a “second” item does not require or preclude the existence of, e.g., a “first” or lower-numbered item, and/or, e.g., a “third” or higher-numbered item.

As used herein, a system, apparatus, structure, article, element, component, or hardware “configured to” perform a specified function is indeed capable of performing the specified function without any alteration, rather than merely having potential to perform the specified function after further modification. In other words, the system, apparatus, structure, article, element, component, or hardware “configured to” perform a specified function is specifically selected, created, implemented, utilized, programmed, and/or designed for the purpose of performing the specified function. As used herein, “configured to” denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being “configured to” perform a particular function may additionally or alternatively be described as being “adapted to” and/or as being “operative to” perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Those skilled in the art will recognize that at least a portion of the controllers, devices, units, and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The term controller/processor, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of controller (e.g., at a first time), as a second type of controller (e.g., at a second time, which may in some instances coincide with, overlap, or follow a first time), and/or as a third type of controller (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first controller that has a first purpose, then a second controller that has a second purpose and then, a third controller that has a third purpose, and so on. The transition of a reconfigurable and/or controllable component may occur in as little as a few nanoseconds, or may occur over a period of minutes, hours, or days.

In some such examples, at the time the controller is configured to carry out the second purpose, the controller may no longer be capable of carrying out that first purpose until it is reconfigured. A controller may switch between configurations as different components/modules in as little as a few nanoseconds. A controller may reconfigure on-the-fly, e.g., the reconfiguration of a controller from a first controller into a second controller may occur just as the second controller is needed. A controller may reconfigure in stages, e.g., portions of a first controller that are no longer needed may reconfigure into the second controller even before the first controller has finished its operation. Such reconfigurations may occur automatically, or may occur through prompting by an external source, whether that source is another component, an instruction, a signal, a condition, an external stimulus, or similar.

For example, a central processing unit/processor or the like of a controller may, at various times, operate as a component/module for displaying graphics on a screen, a component/module for writing data to a storage medium, a component/module for receiving user input, and a component/module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple components/modules, the example includes the possibility that the same hardware may implement more than one of the recited components/modules, either contemporaneously or at discrete times or timings. The implementation of multiple components/modules, whether using more components/modules, fewer components/modules, or the same number of components/modules as the number of components/modules, is merely an implementation choice and does not generally affect the operation of the components/modules themselves. Accordingly, it should be understood that any recitation of multiple discrete components/modules in this disclosure includes implementations of those components/modules as any number of underlying components/modules, including, but not limited to, a single component/module that reconfigures itself over time to carry out the functions of multiple components/modules, and/or multiple components/modules that similarly reconfigure, and/or special purpose reconfigurable components/modules.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise. The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. An aircraft comprising:

a light receiver configured to receive light from a light-emitting device mounted to a structure;

a wireless data communication device configured to communicate with a network via a network node, wherein the network and the network node are remote from the aircraft;

a processor coupled to the light receiver and the data communication device so that data signals are transmittable between the processor and the light receiver and between the processor and the data communication device; and a memory device configured to store computer-executable code configured to cause the processor to perform steps of:

converting the light received by the light receiver into a data signal comprising information about the structure; and transmitting the data signal to an obstruction information database, remote from the aircraft, via the wireless data communication device, the network node, and the network.

2. The aircraft of claim 1, wherein the light, received from the light-emitting device, includes information regarding characteristics of the structure or weather proximate the structure.

3. The aircraft of claim 2, wherein the characteristics of the structure comprise position or dimensional characteristics of the structure.

4. The aircraft of claim 2, wherein:

the data signal includes position of the structure, dimensional characteristics of the structure, or weather proximate the structure; and the computer-executable code is further configured to cause the processor to perform steps of:

determining the structure is an obstruction based on the position or the dimensional characteristics and a desired flight path of the aircraft; or determining the weather is a weather obstruction based on the information regarding the weather proximate the structure and the desired flight path of the aircraft.

5. The aircraft of claim 4, wherein the code is further configured to cause the processor to perform a step of generating navigation signals responsive to the obstruction or the weather obstruction.

6. The aircraft of claim 5, wherein the navigation signals include a safe route to navigate or a closest safe landing place.

7. The aircraft of claim 1, wherein the step of converting the light received by the light receiver into the data signal comprises decoding the light received by the light receiver.

8. A method performed at an aircraft, the method comprising:

receiving light from a light-emitting device mounted to a structure;

converting the light, received by the light receiver, into a data signal comprising information about the structure; and transmitting the data signal to an obstruction information database, remote from the aircraft, via a wireless data communication device disposed on the aircraft, a network node, and a network.

9. The method of claim 8, wherein the light, receive from the light-emitting device, includes information regarding characteristics of the structure or weather proximate the structure.

10. The method of claim 9, wherein the characteristics of the structure comprise position, dimensional characteristics of the structure.

11. The method of claim 9, wherein the data signal includes position, dimensional characteristics of the structure and weather around the structure and the method further comprises:

determining a flight path of the aircraft; and determining the structure is an obstruction based on the position or the dimensional characteristics of the structure and the flight path of the aircraft or determining the weather is a weather obstruction based on the information regarding the weather proximate the structure and the flight path of the aircraft.

12. The method of claim 11, further comprising generating navigation signals responsive to the obstruction or the weather obstruction.

13. The method of claim 8, wherein converting the light received by the light receiver into the data signal comprises decoding the light received by the light receiver.

14. A navigation server, remote from an aircraft, comprising:

a data signal communication device configured to communicate with a network via a network node, wherein the network and the network node are remote from the aircraft;

a processor in data communication with the data signal communication device; and a memory device configured to store computer-executable code configured to cause the processor to perform steps of:

receiving a data signal from the aircraft, the data signal comprises information regarding characteristics of the structure or weather information proximate the structure;

storing the characteristics of the structure and the information regarding the weather information proximate the structure; and making at least the characteristics of the structure available as a database, remote from the aircraft, for flight operators and/or for aircraft control devices, unassociated with the aircraft, via the network.

15. The navigation server of claim 14, wherein receiving the data signal includes decoding the data signal to generate the information regarding the characteristics of the structure or weather information proximate the structure.

16. The navigation server of claim 14, wherein the code is further configured to cause the processor to perform steps of:

receiving a request for information of the characteristics of the structure or the weather information proximate the structure from one of the aircraft control devices; and delivering the information of the characteristics of the structure or the weather information proximate the structure to the one of the aircraft control devices responsive to the request.

17. The navigation server of claim 14, wherein the code is further configured to cause the processor to perform a step of removing duplicate information of the characteristics or the weather from the memory device.

18. The navigation server of claim 14, wherein storing includes:

determining that previously stored information regarding the characteristics or the weather of the structure is identical to currently received information regarding the characteristics or the weather proximate of the structure; and storing the currently received information regarding the characteristics or the weather responsive to the currently received information regarding the characteristics or the weather not being identical to the previously stored information regarding the characteristics or the weather proximate of the structure.

19. A method performed at a navigation server, remote from an aircraft, the method comprising:

receiving a data signal from the aircraft, the data signal comprises information regarding characteristics of the structure or weather proximate the structure;

storing the information; and making the stored information available as a database, remote from the aircraft, for flight operators and/or for aircraft control devices, unassociated with the aircraft, via a network.

20. The method of claim 19, further comprising:

decoding the data signal to generate the information regarding the characteristics of the structure;

storing the information responsive to the information regarding the characteristics of the structure not matching previously stored information regarding the characteristics of the structure; and delivering the information to the aircraft control devices.

* * * * *